United States Patent
Mukai et al.

[11] 3,937,558
[45] Feb. 10, 1976

[54] OPTICAL FIBER LIGHT PEN

[75] Inventors: Kunihiko Mukai; Kikuo Ikeda, both of Tsu, Japan

[73] Assignee: Nippon Glass Fiber Co., Ltd., Japan

[22] Filed: Dec. 4, 1973

[21] Appl. No.: 421,660

[30] Foreign Application Priority Data
Dec. 13, 1972 Japan............................. 47-125095

[52] U.S. Cl............. 350/96 B; 250/227; 178/DIG. 2
[51] Int. Cl.².......................................... G02B 5/14
[58] Field of Search........... 250/227, 216; 350/96 B; 178/DIG. 2

[56] References Cited
UNITED STATES PATENTS

| | | | |
|---|---|---|---|
| 3,414,733 | 12/1968 | Wunderman | 250/227 |
| 3,509,353 | 4/1970 | Sundblad et al. | 250/227 |
| 3,510,667 | 5/1970 | Cleveland et al. | 250/227 |
| 3,749,932 | 7/1973 | Jones | 178/DIG. 2 |
| 3,758,782 | 9/1973 | Radford et al. | 250/227 |
| 3,781,555 | 12/1973 | Keefe | 250/227 |
| 3,868,514 | 2/1975 | Israelsson | 250/227 X |

*Primary Examiner*—Walter Stolwein
*Attorney, Agent, or Firm*—Littlepage, Quaintance, Murphy & Dobyns

[57] ABSTRACT

This invention relates to a light pen, and more particularly to a construction of such light pen in which a small portion having a scanning face and including a combined end of a photonconductive optical fiber bundle is housed within a cartridge body, and the remaining bifurcated portion of the fiber bundle is housed in the pen holder body and a cord provided continuous thereto, the cartridge and pen holder bodies being detachably joined together.

8 Claims, 10 Drawing Figures

OPTICAL FIBER LIGHT PEN

FIELD OF THE INVENTION

This application pertains to light conducting rods used as pre-photocell system components and housings therefor. This invention further relates to a light pen used as an input detector end for a POS (photo-optimetric sensor) or such, and more particularly, to a light pen of the type described, characterized in that the end portion including the combined end which soon becomes worn is constructed as a freely exchangeable cartridge.

BACKGROUND OF THE INVENTION

In a photon-conductive fiber bundle which is bifurcated at one end of its length and combined at the other end, when a light beam enters into the fiber bundle from one of the bifurcated side ends, the light beam passes through the bundle and emerges out of the combined end. The light beam then is reflected on an outside reflector face to turn back into the fiber bundle and emerge out from the other bisected end.

The photon-conductive fiber bundle having such construction is generally used as a light pen serving as an input detector end for photo-optimetric sensor or other similar apparatus. The light pen used for such purposes conventionally is contacted at its end with the reflection label surface upon every scanning so that the end of such light pen suffers wear and deformation due to mechanical friction or rubbing. Such wear is further accelerated, particularly on the tip portion, if the pen is treated roughly or used by different persons because the contact pressure (of the pen against the label surface) is varied according to the individual person's touch who use it. Particularly, in a light pen which is small in diameter at the combined end of the fiber bundle and has high resolving power, deformation of the scanning face of the light pen is increased proportionally to wear of the tip portion, causing change in the light entering and emerging conditions, making it unable to obtain correct results in scanning.

In the past, if such is occasioned, there has been no alternative but to replace the entire light pen with a new one even in the case where the tip portion alone has suffered excessive wear.

Examples of prior art light pens are to be found in U.S. Pat. Nos. 3,758,782; 3,749,932; and 3,509,353.

SUMMARY OF THE INVENTION

An object of the present invention is to provide a light pen in which the end portion is constructed as a cartridge, the cartridge being detachably joined to the pen body portion, allowing replacement of only the end portion where wear takes place most rapidly and excessively without replacing other parts of the pen.

Another object of the present invention is to provide a light pen in which the photon-conductive fiber bundle, which is the main functioning element of the pen, is constructed so as to have separate combined and ramified ends, thereby eliminating influence of the end portion to the pen body portion connected to the cord and thus allowing free arrangement of the bundled fibers at the combined end. In this way it is possible to use various types of cartridges in conformity with the intended use of the pen to thereby expand the scope of use of the light pen.

While these objects can be accomplished by use of various combinations of shapes and structures of the respective parts constituting the present invention, a preferred embodiment thereof is described in detail hereinbelow for the purpose of exemplification with reference to the accompanying drawings. It will therefore be understood that various changes and modifications of structural details can be made within the scope of the present invention as defined by the appended claims.

DESCRIPTION OF THE PREFERRED EMBODIMENT

Figure 1:
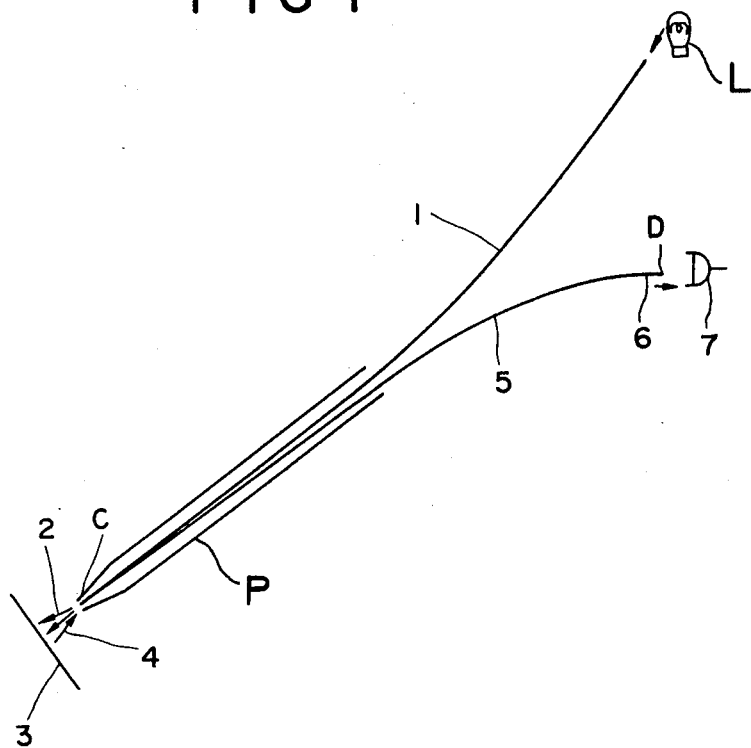
FIG. 1 is a diagram illustrating the operating principle of a light pen.

A photon-conductive fiber bundle is shown diagrammatically in FIG. 1 to have a combined end C and two ramified or bifuracated portions 1 and 5. A light beam from lamp L enters the fiber bundle at the end of portion 1, passes through the bundle and emerges or projects out the combined end C. If an information-recorded label surface 3 is scanned with the end of such a light pen P, the light 2 projecting from the combined end C is reflected as light 4 into the fiber bundle 5 and emerges out from the other end 6. Since the reflected light 4 is varied in its reflection rate according to the pattern existing on the label 3, the quantity of light entering a photoelectric circuit element 7 joined to the end 6 of fiber bundle 5 is also varied accordingly.

Figure 2:
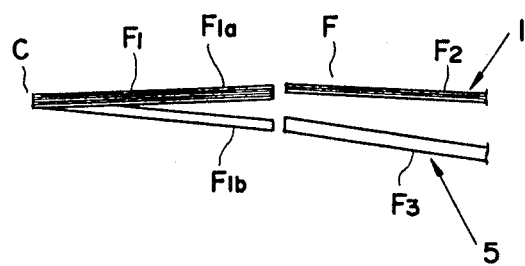
FIG. 2 is a diagram illustrating the structural setup of the present invention.

As shown in FIG. 2, photon-conductive fiber bundle F composed of light projecting type fibers 1 and light receiving type fibers 5 and bifurcated at one end of its length and combined at the other end is divided into a small portion $F_1$ including the combined end and elongated bifurcated portions $F_2$, $F_3$.

Figure 3:
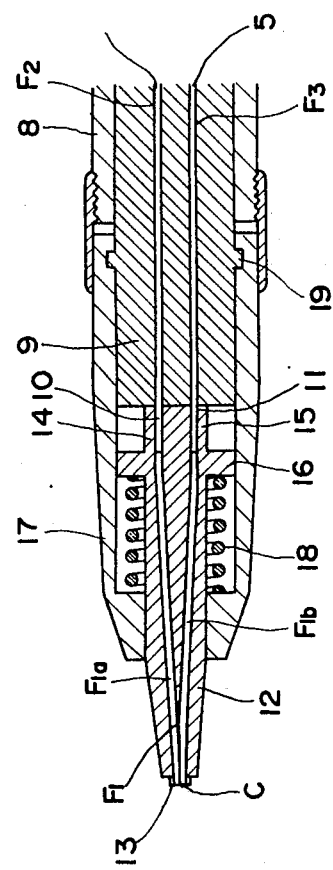
FIG. 3 is a longitudinal sectional view showing a light pen and a cartridge according to the present invention joined together.
Figure 4:
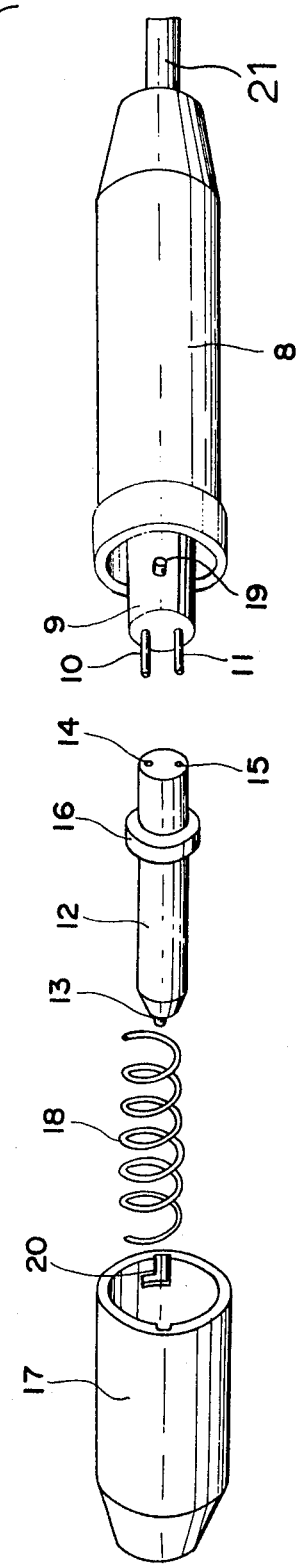
FIG. 4 is an exploded perspective view showing a manner in which the pen body and a cartridge are combined together.

As shown in FIGS. 3, and 4, the bifurcated portions $F_2$ and $F_3$ are inserted into a support member 9 housed in the pen holder body 8 and connected to a cord 21 and are supported by the cylindrical plugs 10, 11 so as to extend out from the support member 9. On the other hand, the small portion $F_1$ including the combined end C of the fiber bundle F is housed and supported in the cartridge body 12, with its combined end C being positioned in a stylus 13 at the end of the cartridge body 12 so that the end C acts as a scanning face, while the divided portions are fitted into the respective holes 14, 15 opened out at the rear end of the cartridge body 12. A flange 16 is also provided around said cartridge body 12. The cartridge body 12 is then inserted into a cap 17, with the stylus 13 being projected out from the other end of the cap 17. A spring 18 is interposed between the flange 16 on the cartridge body 12 and the inner end face of the cap 17. Then, the plugs 10, 11 of the pen body 18 are inserted into the holes or sockets 14, 15 formed in the rear end of the cartridge body 12, and while biasingly supporting the cartridge body 12 by the spring 18, the body is joined with the pen holder body 8. A protuberance 19 is formed on the support member 9 of the pen holder body 8, the protuberance 19 being fitted in a corresponding groove 20 formed in the cap 17 to thereby integrally join both bodies 12 and 8.

Figure 5:
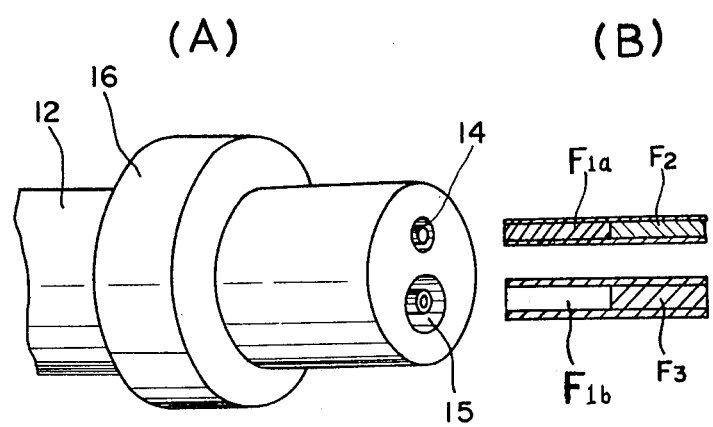
FIG. 5(A) is a perspective detail of the cartridge body and plugs.
FIG. 5(B) is an enlarged sectional view showing a manner in which the cartridge body and plugs in the pen body can be joined together.

In order to prevent loss of light, it is preferred that the relationship between the fiber bundle portion including the combined end C housed in the cartridge body 12 and the end faces of the bifurcated portions is such that, as shown in FIGS. 5(A) and 5(B), the light projecting fiber bundle $F_{1a}$ in the cartridge body 12 is greater in diameter than the fiber bundle $F_2$ on the pen holder 8 side. While as regards the light receiving fibers, the fiber bundle $F_3$ on the pen holder side is formed larger in diameter than the fiber bundle $F_{1b}$ in the cartridge body 12 to thereby minimize leakage of the light conducted and permit effective reception and passing of light beams.

Figure 6:
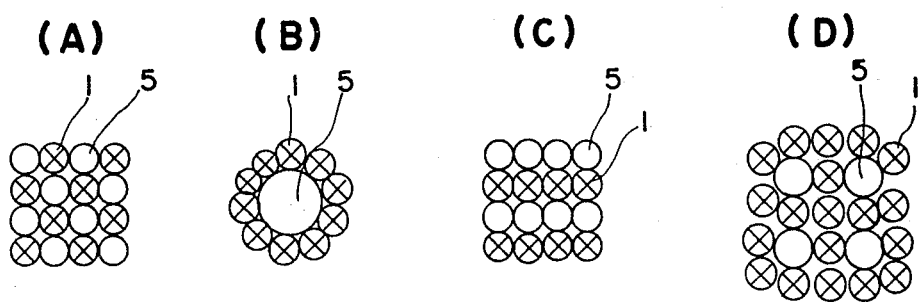
FIG. 6(A) to (D) are diagrams showing some examples of fiber arrangements in the scanning end of the light pen.

Also, in the present invention, various patterns of arrangement, such as exemplified in FIG. 6, can be applied for orientation of the fibers in the fiber bundle at the scanning face of the light pen, that is, at the combined end C of the photoconductive fiber bundle. In the arrangement of FIG. 6(A), the light projecting fibers 1 and the light receiving fibers 5 are disposed alternately on each row. This arrangement can provide most excellent resolution and precision when employed in a light pen having a small light passing area, but the manufacture thereof is difficult and expensive. In the arrangement of FIG. 6(B), several pieces of fine, smaller-diameter light projecting photo-conductive fibers are disposed around a single piece of thick, larger-diameter light receiving fiber. This arrangement provides, substantially the same degree of resolution as the above-mentioned arrangement (A) and can be manufactured at far lower cost than the structure of arrangement (A). This arrangement is therefore considered best suited for a light pen. In the example of (C), the light projecting fibers 1 and the light receiving fibers 5 are arranged alternately from row to row, while in the example of (D), the light projecting fibers 1 are disposed surrounding each light receiving fiber 5. There arrangements are used selectively according to the purpose of use as particular arrangements can have distinct advantages when used with a particular reflecting surface. In any case, as the combined end of the fiber bundle is separated from the bifurcated portions, the portion connecting the cord 21 from the pen holder portion remains perfectly unaffected by the fiber arrangement in the combined end and hence, any desired arrangement can be applied in such a combined end.

As described above, according to the present invention, the small portion having the scanning face and including the combined end of a photon-conductive optical fiber bundle is housed within a cartridge, while the remaining bifurcated or ramified portions of the fiber bundle are used in the pen holder body and also in a cord provided continuous therewith, the cartridge body being detachably joined with the pen holder body, so that when the combined end positioned in the stylus in the cartridge body is worn or damaged in use, the cartridge body alone may be replaced, eliminating any necessity of exchanging the entire light pen as required in the past. Further, various combinations of fiber bundles having combined ends with various patterns of fiber arrangement, as exemplified in FIG. 6, can be adapted in a cartridge according to the purpose of use and such cartridge can be readily affixed to the pen holder body, thus allowing great expansion of the scope of use of the light pen.

We claim:

1. A light pen containing a photon-conductive fiber bundle, the bundle being bifurcated at one end and combined at the other end, comprising,
   a. a cartridge body housing a portion of the photon-conductive fiber bundle including the combined end and a first bifurcated portion thereof, and
   b. a pen holder body housing the remaining bifurcated portions of the fiber bundle, said cartridge body being detachably fixed to an end of said pen holder body, a plug end of each of said remaining portions projecting out from an end face of said pen holder body, the ends of said first bifurcated portion being positioned in corresponding holes opening at an end of said cartridge body opposite that of said cartridge body opposite that of said combined end, said plug ends being detachably received in said corresponding holes.

2. A light pen according to claim 1, wherein a flange is provided around said cartridge body designed to be detachably fixable to said pen holder body, said cartridge body being biased into a cap by a spring such that the foremost end of said cartridge body is projected out from the end of said cap, said cap being also designed to be detachably fixable to said pen holder body.

3. The light pen of claim 1 wherein the bifurcated portions consist essentially of a light projecting fiber bundle and a light receiving fiber bundle.

4. A light pen according to claim 3, wherein the bifurcated portions consist essentially of a light projecting fiber bundle and a light receiving fiber bundle, said light projecting fiber bundle in said cartridge body is greater in diameter than the fiber bundle positioned on the pen holder body side, and wherein said light receiving fiber bundle in said cartridge body is smaller in diameter than said fiber bundle positioned on said pen holder body side.

5. A light pen according to claim 3, wherein at said combined end of said fiber bundle, said light projecting fibers and said light receiving fibers are arranged alternately in each row of such fibers.

6. A light pen according to claim 3, wherein at said combined end of said fiber bundle, a plurality of light projecting photon-conductive fiber filaments of smaller diameter are disposed around a single piece of light receiving photon-conductive fiber filament having a larger diameter.

7. A light pen according to claim 3, wherein at said combined end of said fiber bundle, said light projecting fibers and said light receiving fibers are arranged alternately from row to row.

8. A light pen according to claim 3, wherein at said combined end of said fiber bundle, said light projecting fibers are arranged such that they surround each piece of said light receiving fibers.

* * * * *